J. L. CREVELING.
ELECTRIC REGULATION.
APPLICATION FILED MAY 17, 1915.
1,303,776.
Patented May 13, 1919.
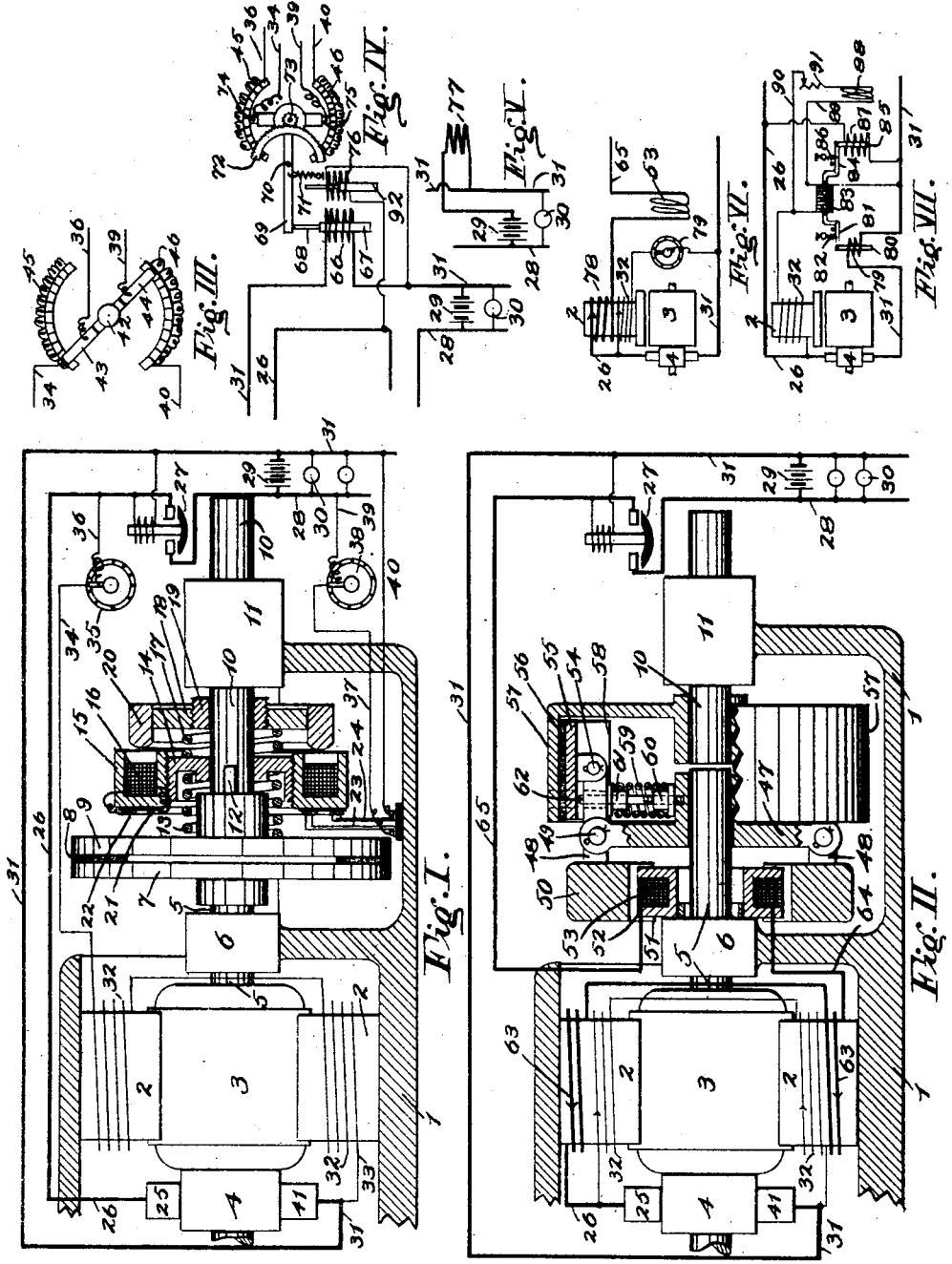
INVENTOR:
John L. Creveling

UNITED STATES PATENT OFFICE.

JOHN L. CREVELING, OF AUBURN, NEW YORK.

ELECTRIC REGULATION.

1,303,776.   Specification of Letters Patent.   Patented May 13, 1919.

Application filed May 17, 1915. Serial No. 28,725.

*To all whom it may concern:*

Be it known that I, JOHN L. CREVELING, a citizen of the United States, residing at Auburn, in the county of Cayuga and State of New York, have invented new and useful Improvements in Electric Regulations, set forth in the annexed specification and drawing forming a part thereof.

My invention pertains to that class of electric regulation wherein it is desired to regulate a dynamo electric machine in a predetermined manner, and provides means whereby speed and output may both be regulated.

Figure I. is a diagrammatic representation of a system of electrical distribution embodying my invention.

Fig. II. is a diagrammatic representation of a system of electrical distribution comprehending my invention.

Fig. III. is a diagrammatic representation of a modification which will be explained as incorporated in that system shown in Fig. I.

Fig. IV. is another modification which will be explained as incorporated in the system shown in Fig. I.

Fig. V. is a modification which may be made in that portion of the system shown in Fig. IV.

Fig. VI. shows a modification which will be explained as employed in the system shown in Fig. II.

Fig. VII. is a modification which will be explained with reference to that system shown in Fig. II.

In Fig. I., 1 represents a portion of the frame or shell of a dynamo electric machine provided with field magnet cores 2, surrounding the armature 3, provided with the commutator 4, and supported by the shaft 5 running in suitable bearings, one of which is indicated at 6. The shaft 5 carries the disk or flange 7 fixed thereupon.

8 represents a section of an annular friction member or washer adapted to frictionally engage the surface of the disk 7, which is preferably machined smooth. The member 8 is preferably made of leather, canvas, or some of the usual well known forms of brake lining, and is attached to the disk 9 so as to revolve therewith. The disk 9 is mounted upon the shaft 10, carried within a suitable bearing member indicated at 11. The disk 9 may slide laterally upon the shaft 10, but is prevented from revolving upon the said shaft by means of key or feather 12.

13 is a spring pressing against the disk 9 in such manner as to tend to move the same in a left-handed direction upon the shaft 10, so as to press the face of the member 8 against the disk 7 and frictionally engage the same. The opposite end of the spring 13 presses against the member 14, which is free to move laterally upon shaft 10, and which carries the annular magnet shell or frame 15, adjustable thereupon as by means of the screw thread shown, and provided with energizing windings 16.

17 is a compression spring held between the member 14 and the annular member 18, engaging the thread upon the member 19 which is fixed upon the shaft 10. The member 18 carries an annular magnetic keeper 20, attracted by the magnet 15—16 when excited. One end of the winding 16 is connected with the collector ring 21, while the opposite end of the winding 16 is connected with the collector ring 22. The ring 21 is in electrical communication with the wiper 23, while ring 22 is in communication with the wiper 24.

The brush 25 of the dynamo is connected as by wire 26 with the automatic switch 27, from which wire 28 may be carried to one side of the storage battery 29 and lamps or other translating devices 30. The opposite terminals of the battery 29 and translating devices 30 are connected as by wire 31 with brush 41 of the generator. The field winding 32 is connected with one lead 31 as by wire 33, and by wire 34 with one terminal of the resistance device 35, having its remaining terminal connected as by wire 36 with the opposite lead 26.

The wire 37 connects the wiper 23 with the resistance device 38, the remaining terminal of which is connected as by wire 39 with the lead 28. The wiper 24 is connected with the opposite lead 31 as by wire 40.

In Fig. II., 1 represents the frame or shell of the dynamo, having field magnet cores 2 around the armature 3, provided with commutator 4, and carried by shaft 5 running in suitable bearings, one of which is indicated at 6.

The shaft 5 carries fixed thereupon the member 47, having pivotally attached at the opposite arms thereof levers 48 as by means of pins 49. One extremity of each of the levers 48 carries a weight 50, which is made of iron or other magnetic material, and preferably partially surrounds the annular magnet shell 52, as indicated at 51.

The shell 52 is preferably made of iron or other magnetic material, and provided with a winding 53, and held in a central position with regards weights 50, as for example, upon a collar or sleeve around the shaft 5 and supported by bearing 6, as indicated.

The opposite extremities of the levers 48 are pivotally connected as by pins 54 with circular shoes 55, carrying attached to the outward surfaces thereof a layer of a suitable brake lining material, as indicated at 56, which is pressed against the inner surface of the shell 57 as by means of compression spring 59 engaging the flange of the internally threaded member 60, made up on the screw 62, passing through a slip hole in the member 61. The shoes 55 preferably extend along the inner surface of the shell 57, as indicated at 58.

The field energizing or shunt coils 32 are shown as directly in shunt across the brushes, while the brush 25 is connected as by lead 26 with the differential winding 63, the opposite terminal of which is carried as by lead 64 to one terminal of the winding 53, the remaining terminal of which is carried as by lead 65 to one side of the switch 27, from the opposite side of which main 28 is carried to one side of the storage battery 29 and lamps or other translating devices 30, from which return is made as by wire 31 to the brush 41.

In Fig. III., the wire 34 of Fig. I. is shown as connected with a series of resistance segments 45, operatively engaging the lever 43 connected with the wire 36, while the wire 40 is connected with resistance segments 46 in communication with the arm 44 which is connected with the wire 39. The arms 43 and 44 may be revolved by means of handwheel 42, so as to simultaneously vary resistances 45 and 46.

In Fig. IV., the lead 31 of Fig. I. is indicated as having in series therewith a coil 66 surrounding a core of magnetic material 67, carrying the member 68, adapted when raised against the force of gravity, for example, to engage the lever 69 and tend to swing the same around its pivot 70 against the action of spring 71 in such manner as to swing the gear segment 72 and revolve pinion 73 in a counter clockwise direction and cause the brushes 74 and 75 to travel along the resistance segments 45 and 46 respectively, and increase the resistance in series between wires 34 and 36 and between wires 39 and 40 respectively.

76 represents a shunt coil across the leads 26 and 31, adapted when energized to tend to lift its core 92 in such manner as to engage the lever 69, as above mentioned with regard to core 67.

In Fig. V. there is shown a portion of the instrumentalities shown in Fig. IV., but the coil 66 in series with lead 31 is suppressed, and the coil 77 in series with the battery 29 is shown in its stead.

In Fig. VI. there is indicated a portion of the system of Fig. II., but the field winding 32 is shown as having in series therewith an adjustable resistance 79, while the differential winding 63 is suppressed and an additive winding 78 is shown in its stead.

In Fig. VII. there are shown parts of the system indicated in Fig. II., and the dynamo is shown as provided with only the shunt windings 32 having in series therewith a rheostat indicated as carbon pile at 83. The lead 31 has in series therewith the coil 79 surrounding a suitable core 80 and tending when energized to draw the same downwardly and depress the lever 81 against the action of spring 82 so as to increase the resistance 83. The opposite end of the carbon pile 83 is engaged by lever 84 carrying the core 85 and normally drawn in an upward direction as by spring 86.

87 is a fine coil surrounding the core 85 and in shunt across the leads 31 and 26, and tending when energized to draw the core 85 downwardly against the action of spring 86 and increase resistance 83.

88 is a winding substituted for the winding 53 of Fig. II. and placed in shunt across the variable resistance 83 as by wires 89 and 90 and having in series therewith a regulating resistance 91.

The operation of my invention is substantially as follows:

If shaft 10 of Fig. I. be revolved, the disk 9 and friction member 8 attached thereto will also revolve and tend to rotate the disk 7, and in this manner drive the shaft 5 and armature 3, and, if the armature speed be sufficient, its field will build up in a well known manner and may be controlled as by means of resistance 35.

If we consider 25 as the positive brush of the generator, and the voltage as sufficient to close switch 27 and in excess of the voltage of the storage battery 29, current will flow from brush 25 through wire 26, switch 27, lead 28, battery 29, and translating devices 30, and return through lead 31. And, it will be obvious that adjustment of the pressure of the friction member 8 against the disk 7 may determine a load or output of the generator which cannot be increased above a certain amount, regardless of increases in speed of the shaft 10, for the reason that when the torque becomes a certain quantity the surface of the member 8 will slip upon the disk 7 and prevent the torque exceeding this amount.

By adjustment of the member 18 upon the thread of the member 19 I can adjust the pressure of the member 8 against the disk 7, for I can vary the pressure exerted upon the compression spring 17 against the sliding member 14 and compression spring 13 engaging the disk 9. Therefore, I can cause the generator to give a desired output at or above a certain critical speed; for when this speed is exceeded the frictional contact at 7—8 will simply slip. While such frictional regulation is possessed of many advantages, if the speed variations be very wide it becomes a very wasteful type of regulation, for considerable energy is wasted in heat developed by slippage.

It will be noted that the frictional contact may be governed by regulating the amount of current flowing in the winding 16, which in turn may be controlled by the resistance 38, for attraction of the magnet 15—16, adjustable upon member 14, toward its keeper 20 will decrease the pressure exerted by the spring 13 in holding the friction members in contact.

And it will also be obvious that, with the given output of the generator, if the field be weakened and the speed increased to compensate for the diminution of field strength, the said load may be carried with a lesser torque, owing to the greater angular velocity of the inductors. Therefore, if the member 18 be so adjusted upon the thread of member 19 that, with a given field strength, the member 8 will carry the disk 7 with it at its own velocity until the desired load is being carried by the generator, and then if the shaft 10 have its velocity increased to say double this speed, the disk 7 and the armature 3 will only revolve at their normal full load speed, or half the speed of the shaft 10, and even greater increase in the velocity of the shaft 10 will not materially increase the speed or output of the generator, but will greatly increase the loss due to heat in the frictional sliding contact. However, if when the shaft 10 is running much faster than the armature 3 with the normal load, resistance be inserted at 35 so as to weaken the field current in the coils 32, the generator speed may be increased and the loss due to slippage decreased and the benefits of the slip regulation retained, provided the pressure between the member 8 and disk 7 be properly lessened as the torque of the armature 3 decreases and its angular velocity increases. This adjustment of the pressure upon the frictional contact may be effected by properly varying the resistance 38 controlling the attraction between the magnet 15—16 and its keeper 20.

If the device shown in Fig. III. be substituted for the resistance devices 35 and 38, the frictional contact 8 and the field current in the coils 32 may be simultaneously adjusted to meet the requirements, by turning the knob 42 controlling the resistances 45 and 46.

If that modification shown in Fig. IV. be used, I so adjust the member 18 of Fig. I. that the maximum current output to be delivered by the generator will not quite cause slippage between the member 8 and disk 7 under normal running, for the maximum current to be delivered in this modification is controlled by coil 66.

If with this arrangement the desired maximum current output of the generator be reached, coil 66 will attract the plunger 67 so as to raise lever 69 and insert resistance 45 into the field circuit and prevent the generator output from increasing with increased speed within the limits of regulation afforded by the rheostat or resistance device 45. If, however, the speed be increased beyond the range that can be compensated for by the resistance 45, then slippage will take place between the members 8 and disk 7 and prevent the load upon the generator from being materially increased throughout further increases in speed, owing to the fact that, as resistance is increased at 45, resistance is also withdrawn at 46 in such manner as to lessen the frictional contact in such proportion as the torque necessary to maintain the desired output decreases with the weakening of the field and speed increase.

With this arrangement, excessive voltage is also prevented by means of the coil 76 in shunt across the leads, which upon extreme rises in voltage may also affect the field resistance.

With this modification it will be noted that the generator may be governed throughout most of its operation, or in fact, throughout all of its normal operation, electrically, but is also at all times capable of being mechanically regulated by the slip connection between the driving and driven members, provided at any time the electrical regulating devices do not respond with sufficient rapidity.

The portion of that modification brought out in Fig. V. is identical with that shown in Fig. IV., with the exception that the coil 66 in the main generator circuit is suppressed and the coil 77 in the battery circuit used in its stead. With this arrangement the current in the battery circuit may be held from exceeding a predetermined limit electrically by the operation of coil 77 and the total output of the generator will be held from being exceeded by means of the mechanical governing feature of the slip or frictional connection.

In the system shown in Fig. II. the armature 3 will revolve with the shaft 10 and current will flow from the positive brush 25 through lead 26, differential coil 63, wire 64, winding 53, lead 65, switch 27, battery 29 and translating devices 30, and return through lead 31 provided the shaft 10 be revolving above the critical speed.

And it will be noted that the speed at which the armature will be driven will depend upon the pressure of the friction faces 56 of the shoes 55 against the shell 57 which is controlled by the spring 59 and the action of centrifugal force upon the weights 50, which are also influenced by the magnetic action of the winding 53, which in this instance is a function of the total current output.

With this arrangement, if the coils 63 and 53 be rendered inoperative, as for purpose of adjustment, the armature 3 will revolve at the same speed as the shaft 10 until the action of centrifugal force upon the weights 50 so lessens the pressure on the frictional driving contact that the load upon the armature 3 will cause the shoes to slip upon the driving member 57, when further increases in speed of the shaft 10 and member 57 will not increase the speed of revolution of the armature, but, if the shell 57 be revolving considerably in excess of the armature speed a considerable loss in heat will take place for the mere purpose of regulation at the friction surfaces. However, by using the differential compound winding 63, any increase in load upon the generator above a certain critical point, determined by properly proportioning coils 32 and 63 with relation to the saturation of the magnetic circuit of the generator, will, by flowing through the coil 63 in a reverse direction to the shunt coil 32, so act as to weaken the field and permit the generator speed to be increased considerably without materially increasing the output. And, this current passing through the coil 53, if the coil 53 be properly proportioned, may be made to counteract the action of centrifugal force upon the weights 50 in such manner that the speed of the armature may be raised within certain limits as the speed of the driving shaft 10 increases, and thus allow speed increases of the armature 3 approximately in proportion as the strength of the field windings of the generator permit its speed to be raised without materially affecting its output. In this way I produce a generator with a mechanical governor which is always ready to slip if overloaded, but which throughout certain ranges allows the generator to be electrically governed to such extent as to reduce the great variations in speed difference between the armature and the driving member, and thus save what would otherwise be lost in heat.

If that modification shown in Fig. VI. be employed, the above outlined operation with regard to Fig. II. will be carried out, with the exception that I have shown coil 78 in place of the differential coil 63, and the coil 78 as assisting the coil 32. This arrangement may be desired particularly when the dynamo is used as a motor, transmitting power through the centrifugally controlled clutch, and the field 32 is shown manually controlled as by resistance device 79, the coil 53 being shown in series with the main load, as in Fig. II.

In that modification shown in Fig. VII. I have shown a carbon pile 83, in series with the shunt or energizing coils 32, the said carbon pile being controlled either by the coil 79 or the coil 87. The coil 79 is in series with the main load, and by increasing the resistance 83 may prevent the total current from exceeding a predetermined limit, while the coil 87, in shunt across the leads, may prevent the generator voltage from exceeding a predetermined limit. As resistance 83 is increased to cut down the field excitation and thereby permit increase in armature speed without material increase in output, the potential difference across 83 will necessarily rise and cause current to flow in the coil 88 in shunt across the resistance 83 as by wires 89 and 90 through an adjustable resistance 91, if desired.

And, as the coil 88 is substituted for the coil 53 in Fig. II., this increase of current in the coil 88 may adjust the action of centrifugal force necessary upon the frictional contact, as outlined above with regard to Fig. II.

From the foregoing it will be obvious that I have produced means whereby a dynamo electric machine may be driven from a driving member having its speed varied throughout a very wide range; and that throughout speed changes I have preserved the advantages of slip regulation, preventing sudden shocks and excessive speeds being imparted to the armature, and that throughout certain limits I have provided means whereby speed changes of the armature will be permitted in such manner as to avoid the heat loss which is usually present throughout all regulating functions of slip or frictional regulators.

It will also be obvious that while I have described my invention particularly with regard to generators driven at variable speeds, it is equally applicable to motors carrying intermittent loads. And as this is the mere converse of the particular application which I have most generally chosen to use, such operation is not described in detail, as it will be plain to those skilled in the art.

I do not wish in any way to limit myself to the exact constructions nor instrumentalities shown and described in this specification for the purpose of illustrating the use of my invention merely, for it will be obvious that wide departure may be made therein without departing from the spirit and scope of my invention, which is as set forth in the following claims:

1. The combination with a dynamo and a prime mover, of power transmitting means connecting the same and means for regulating said dynamo and simultaneously affecting said transmitting means.

2. The combination with a dynamo and frictional power transmitting means driving the same, of means for regulating the dynamo and simultaneously affecting the transmitting means.

3. The combination with a dynamo and frictional driving means operating the same, of automatic means for regulating the dynamo and simultaneously affecting the driving means.

4. The combination with a dynamo and a prime mover, of means for operatively connecting the same and affecting the relative velocities thereof, and means for controlling the aforesaid means and regulating the field strength of the dynamo.

5. The combination with a movable member, a dynamo, and power transmitting means operatively connecting the same and capable of permitting variations in relative speeds thereof, of electrically responsive means for affecting the speed relation thereof and means for affecting the magnetic field of the dynamo to regulate an electrical characteristic of the dynamo.

6. The combination with a dynamo and a movable member, power transmitting means operatively connecting the same and permitting relative speed variations therebetween, of means for automatically decreasing the difference in speed between said elements and simultaneously regulating said dynamo.

7. The combination with a dynamo and a movable member, power transmitting means operatively connecting the same and permitting relative speed variations therebetween, of means for automatically decreasing the difference in speed between said elements and means for correspondingly regulating said dynamo.

8. The combination with a dynamo and a movable member, power transmitting means operatively connecting the same and permitting relative speed variations therebetween, of automatic means for decreasing the difference in speed between said elements and simultaneously regulating said dynamo to compensate for speed changes.

9. The combination with a dynamo, a storage battery and translating devices coöperating therewith, of a prime mover and means mechanically connecting the dynamo and prime mover and controlling the total output of the dynamo, combined with means responsive to the current supplied to the storage battery for regulating the dynamo and affecting the power transmitting means.

10. The combination with a dynamo, movable means and means connecting the same with said dynamo and capable of permitting differences in velocity between the dynamo and the movable means, and a plurality of power circuits coöperating with said dynamo; of means whereby the total energy in said circuits affects the speed relation of the dynamo and the movable means; and means whereby fluctuations in one of said circuits affects electrical regulation of the dynamo.

11. The combination with a dynamo and power transmitting means, of means for electrically affecting the operation of the dynamo and adjusting its relationship to the power transmitting means to compensate for the change of such relationship brought about by changes in the electrical regulation of the dynamo.

JOHN L. CREVELING.

Copies of this patent may be obtained for five cents each, by addressing the "Commissioner of Patents, Washington, D. C."